United States Patent
Zhou (10) Patent No.: US 9,650,941 B2
(45) Date of Patent: May 16, 2017

(54) RANKINE CYCLE FOR A VEHICLE

(71) Applicant: Ford Global Technologies, LLC, Dearborn, MI (US)

(72) Inventor: Shiguang Zhou, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 100 days.

(21) Appl. No.: 14/571,746

(22) Filed: Dec. 16, 2014

(65) Prior Publication Data

US 2016/0169079 A1  Jun. 16, 2016

(51) Int. Cl.
| F01K 23/06 | (2006.01) |
| F01K 25/08 | (2006.01) |
| F01P 3/18 | (2006.01) |
| F01P 3/22 | (2006.01) |
| B60H 1/00 | (2006.01) |
| F01P 3/20 | (2006.01) |

(52) U.S. Cl.
CPC ........ *F01P 3/2271* (2013.01); *B60H 1/00007* (2013.01); *F01K 23/065* (2013.01); *F01K 25/08* (2013.01); *F01P 3/20* (2013.01); *F01P 2003/187* (2013.01); *F02G 2260/00* (2013.01); *Y02T 10/166* (2013.01)

(58) Field of Classification Search
CPC ....... F01K 23/065; Y02T 10/16–10/166; F01P 3/18; F01P 2003/182–2003/187
USPC ................ 60/615–618, 643–681; 123/41.31
See application file for complete search history.

(56) References Cited

U.S. PATENT DOCUMENTS

| 3,339,663 | A | * | 9/1967 | Anderson | ................ B60K 3/04 122/11 |
| 3,589,436 | A | * | 6/1971 | Anderson | .......... B60H 1/00007 165/43 |
| 5,000,003 | A | | 3/1991 | Wicks | |
| 5,009,262 | A | | 4/1991 | Halstead et al. | |
| 5,327,987 | A | * | 7/1994 | Abdelmalek | ............ B60K 6/48 180/65.25 |
| 8,327,654 | B2 | | 12/2012 | Taylor | |
| 8,567,193 | B2 | * | 10/2013 | Terashima | ............ F01K 23/065 60/320 |
| 9,440,512 | B2 | * | 9/2016 | Kim | ........................ B60H 1/32 |
| 2004/0063535 | A1 | * | 4/2004 | Ibaraki | ...................... B60K 6/44 477/3 |
| 2009/0211253 | A1 | * | 8/2009 | Radcliff | ................ F01K 23/065 60/670 |
| 2010/0180584 | A1 | * | 7/2010 | Berger | ................... F02M 26/28 60/320 |
| 2010/0192569 | A1 | | 8/2010 | Ambros et al. | |

(Continued)

FOREIGN PATENT DOCUMENTS

JP   2009097481 A  *  5/2009  ............ F01K 13/02

*Primary Examiner* — Laert Dounis
(74) *Attorney, Agent, or Firm* — Brooks Kushman P.C.; Greg P. Brown (57) ABSTRACT

A vehicle includes a pump, an evaporator, and an expander in sequential fluid communication in a closed loop containing a condenser configured to transfer heat between a working fluid and ambient air. The vehicle has a generator driven by the expander. The evaporator is configured to transfer heat from at least one of an engine coolant, a battery coolant, an engine lubricant, a transmission lubricant, an exhaust gas in an exhaust system, and an exhaust gas in an exhaust gas recirculation (EGR) system to the working fluid.

15 Claims, 4 Drawing Sheets

(56) References Cited

U.S. PATENT DOCUMENTS

| | | | |
|---|---|---|---|
| 2010/0243017 A1* | 9/2010 | Normann | H01M 10/443 |
| | | | 136/205 |
| 2011/0083920 A1 | 4/2011 | Mori et al. | |
| 2011/0132030 A1* | 6/2011 | Kim | B60H 1/00885 |
| | | | 62/507 |
| 2011/0308253 A1 | 12/2011 | Ritter | |
| 2012/0023946 A1* | 2/2012 | Ernst | F01K 9/04 |
| | | | 60/660 |
| 2012/0285170 A1* | 11/2012 | Mori | B60H 1/3227 |
| | | | 60/670 |
| 2013/0086902 A1 | 4/2013 | Khadiya | |
| 2013/0312418 A1* | 11/2013 | Kardos | F01N 5/02 |
| | | | 60/668 |

* cited by examiner

RANKINE CYCLE FOR A VEHICLE

TECHNICAL FIELD

Various embodiments relate to power generation and waste heat recovery using a Rankine cycle system in a vehicle.

BACKGROUND

Vehicles, including hybrid vehicles, have internal combustion engines that produce exhaust gases at a high temperature. The vehicle also may have various systems with waste heat and requiring cooling, e.g. the engine coolant system with coolant fluid. Typically, the engine exhaust is directed through an aftertreatment system to the ambient environment, and may include an exhaust gas recirculation loop, emissions systems, and the like. The coolant system may include a radiator provided adjacent to a front facing surface of the vehicle to cool the coolant fluid using ambient air from the outside environment.

SUMMARY

In an embodiment, a vehicle is provided with a pump, an evaporator, and an expander in sequential fluid communication in a closed loop containing a condenser configured to transfer heat between a working fluid and ambient air. The vehicle has a generator driven by the expander. The evaporator is configured to transfer heat from an engine coolant, a battery coolant, an engine lubricant, a transmission lubricant, and an exhaust gas and an exhaust gas recirculation (EGR) system to the working fluid.

In another embodiment, a vehicle is provided with a Rankine cycle having a pump, a first heater, a second heater, an expander, and a condenser in sequential fluid communication with one another. The vehicle has an engine exhaust system that is configured to controllably provide waste heat from exhaust gas to one of the first and second heaters. A recirculation system is adapted to provide waste heat from a vehicle component to the other of the first and second heaters using a recirculating fluid.

In yet another embodiment, a vehicle process is provided. A working fluid is pumped in a closed loop thermodynamic cycle. The working fluid is heated using waste heat from a recirculating fluid in a vehicle system. The flow of engine exhaust gas is controlled through an evaporator in the cycle, a bypass line, and a combination of the evaporator and bypass line. The working fluid is heated with any engine exhaust gas flowing through the evaporator. A turbine is driven using the working fluid to rotate an electrical power generator. The working fluid is cooled in a condenser of the cycle using ambient air received through a frontal opening in the vehicle.

Various embodiments of the present disclosure have associated, non-limiting advantages. For example, a Rankine cycle for a vehicle is provided to recover waste heat energy from vehicle systems and charge a battery. The condenser of the Rankine cycle is provided in a front region of the vehicle to use the incoming ambient air flow to cool the working fluid of the cycle. Air-cooled heat exchangers for fluids providing waste heat to the Rankine cycle are therefore eliminated, and provide additional packaging space for the condenser. The Rankine cycle includes heat exchangers to heat the working fluid that also act as heat sinks for the waste heat fluids, and may be positioned at various locations in the vehicle. By using one condenser in the Rankine cycle to transfer residual waste heat to ambient air from various multiple vehicle systems, the overall size of the condenser may be smaller than the cumulative size of corresponding air-cooled heat exchangers for the system as the various vehicle systems generally do not all operate at maximum cooling load simultaneously, and space that would have otherwise been required between individual air coolers may be also used for the Rankine condenser.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Description of constituents in chemical terms refers to the constituents at the time of addition to any combination specified in the description, and does not necessarily preclude chemical interactions among constituents of the mixture once mixed. A fluid as described in the present disclosure may refer a substance in various states or phases including to vapor phase, liquid phase, mixed vapor/liquid phase, superheated gases, sub-cooled liquids, and the like.

A Rankine cycle may be used to convert thermal energy into mechanical or electrical power. Efforts have been made to collect thermal energy more effectively or from more than one system that rejects waste heat. For example, according to the disclosure, waste heat may be obtained from various combinations of engine coolant, engine or transmission oil, exhaust gas recirculation (EGR) gases, exhaust gases, etc. The Rankine cycle is a gas-liquid phase process, and therefore the condenser capacity may be generally matched to the capacity of the collected heat to maintain the gas-liquid phase cycle. In a vehicle application, Rankine system performance may be challenged more by the process of rejecting heat from the cycle than by collecting heat into the cycle, as packaging a condenser with a sufficient size and capacity at the front of the vehicle is difficult. The present disclosure provides for a Rankine cycle that accommodates the packaging requirements within a vehicle as well as recovers waste heat from various vehicle sources to increase the vehicle efficiency.

Figure 1:
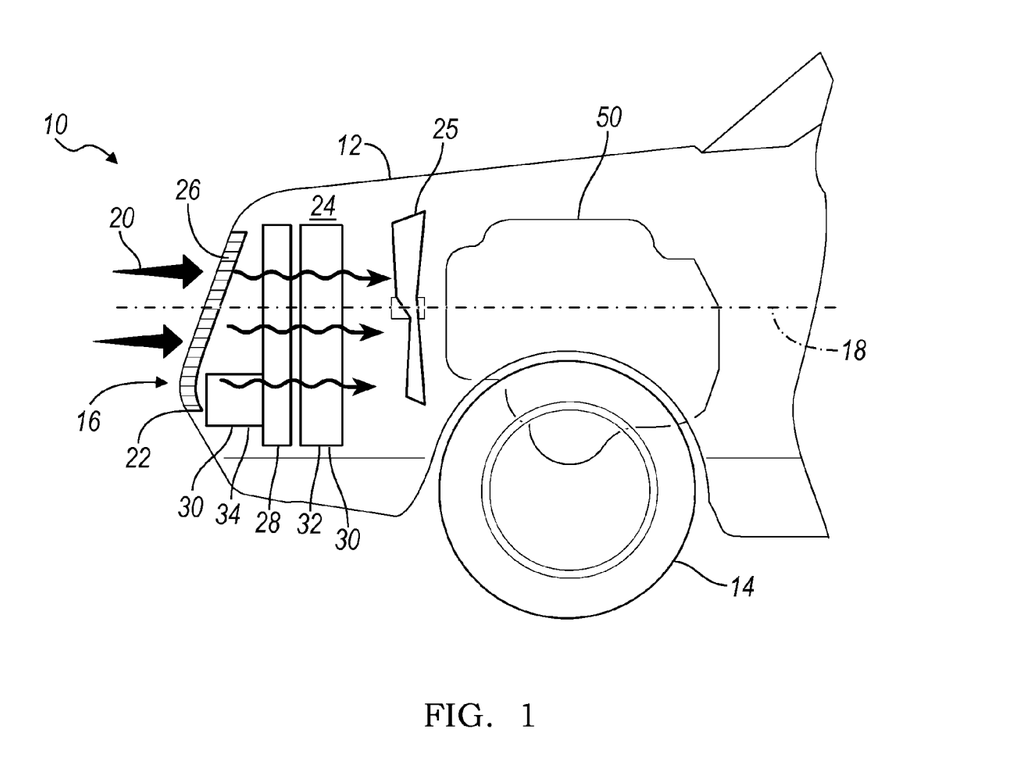
FIG. 1 illustrates a side view schematic of a vehicle according to an embodiment.

FIG. 1 illustrates a partial schematic of a vehicle 10 according to an embodiment. The vehicle 10 has a vehicle body 12 that may be made of one or more vehicle panels and may include a chassis structure or load-bearing member such as a unibody panel. The vehicle 10 has wheels 14 that support the vehicle 10 on an underlying surface. The vehicle body 12 has a front region or front facing region 16 that may be generally transverse to the longitudinal axis 18 of the vehicle. The front facing region 16 may be generally the forwardmost portion of the vehicle body 12. The front facing region 16 may include a section that is generally transverse to an ambient air flow 20 when the vehicle is in forward motion or a cooling fan is operating. The vehicle body 12 defines an opening 22 through which the ambient air flows to an interior frontal region 24 or cavity in the body 12 to interact with one or more heat exchangers. A cooling fan 25 may be provided as shown, and may be positioned at various locations within the frontal region 24. In other embodiments, the vehicle operates without a cooling fan 25. The opening 22 may be covered with a grille 26 or the like.

A condenser 28 for an air conditioning system may be positioned within the region 24 such that the incoming ambient air flow through the opening 22 cools a refrigerant in the system. The air conditioning system may provide for cooling of a vehicle cabin.

A condenser 30 for a thermodynamic cycle, such as a Rankine cycle, may also be positioned within the region 24 such that an ambient air flow cools a working fluid in the cycle. The condenser 30 may be divided into multiple portions or sections, and may be provided as a staged condenser.

In one example, the condenser 30 has a first portion 32 and a second portion 34 that are spaced apart from one another along the longitudinal axis 18 of the vehicle. The condenser 28 for the air conditioning system may be positioned between the first and second portions 32, 34 of the cycle condenser 30. In other examples, the condensers 28, 30 may be positioned in other manners based on the packaging space available, the relative sizes of the condensers, and the desired temperature of the ambient air flow over the respective condenser 28, 30. For example, the condenser 30 may be a unitary component, and/or the portions 32, 34 may be positioned directly adjacent to one another or spaced apart along another vehicle axis. The portions 32, 34 may be of different size or the same size. The arrangement of the portions 32, 34 of the condenser 30, and the air conditioning condenser 28 may also be arranged based on a cooling requirement for each heat exchanger, as the ambient air flow temperature may increase downstream after flowing over an upstream heat exchanger.

As shown in FIG. 1, the vehicle 10 may be provided without any additional radiators, oil coolers, battery air coolers, exhaust gas recirculation heat exchangers, or other air cooled heat exchangers in the front region of the vehicle for cooling of the various vehicle systems using ambient air. In an example, fluids in various vehicle systems are cooled via heat transfer to the working fluid within heat exchangers of the Rankine cycle, and the working fluid is in turn cooled in the condenser 30 of the Rankine cycle using ambient air. In one example, any cooling for fluids in various vehicle systems or components is accomplished via the condenser 30 and two heat transfer processes and an expansion process in the Rankine cycle assuming no thermal losses from a fluid in the vehicle system. The Rankine cycle allows for energy recovery by converting waste heat in the vehicle to mechanical power or electrical power that would otherwise be transferred to ambient air.

Figure 2:
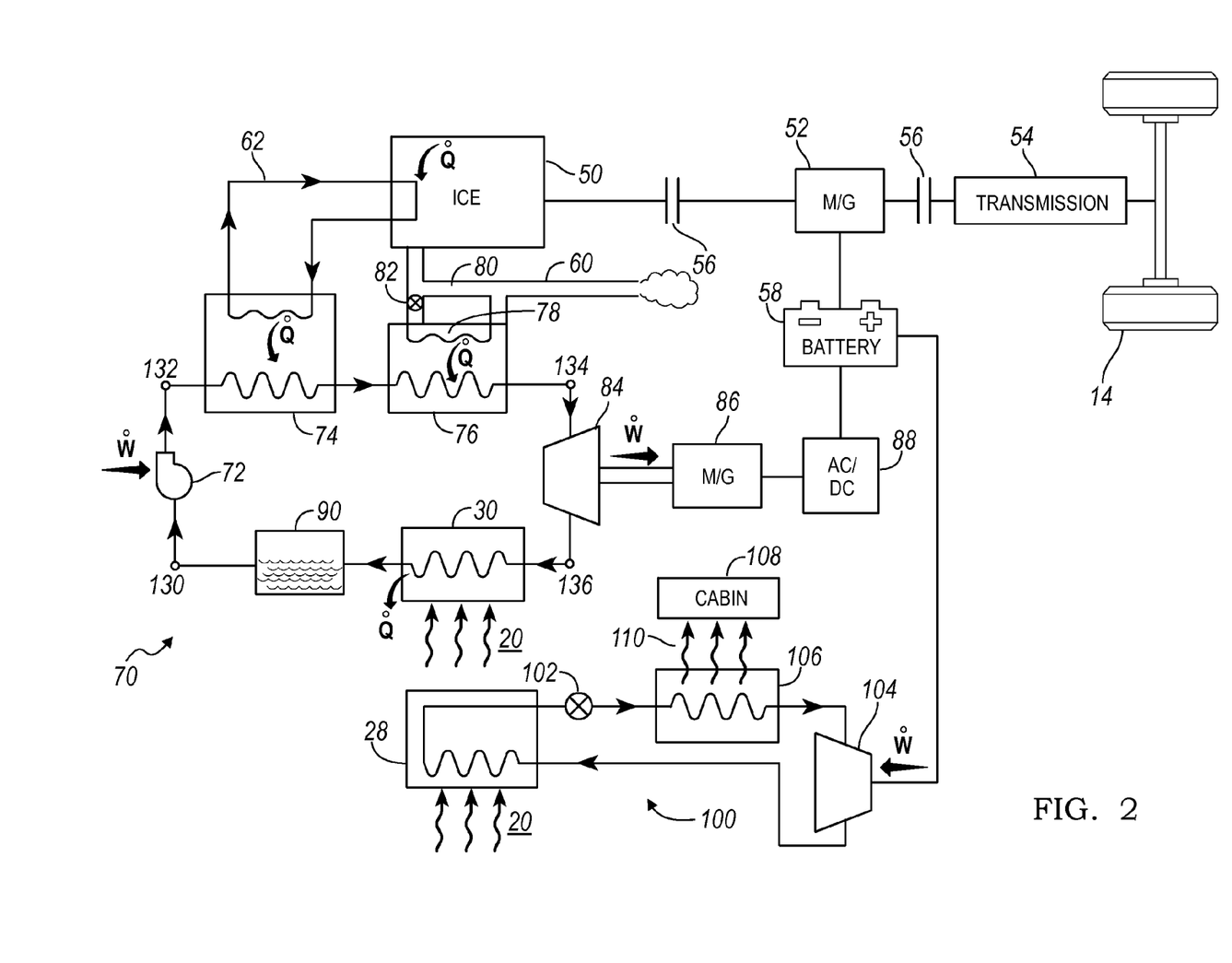
FIG. 2 illustrates a schematic of systems of the vehicle of FIG. 1.

FIG. 2 illustrates a simplified schematic of various systems within a vehicle, such as vehicle 10. The vehicle may be a hybrid vehicle with multiple sources of torque available to the vehicle wheels. In other examples, the vehicle is conventional with only an engine, or is electric. In the example shown, the vehicle has an internal combustion engine 50 and an electric machine 52. The electric machine 52 may be a motor or a motor/generator. The engine 50 and the electric machine 52 are connected via a transmission 54 to one or more vehicle wheels 14. The transmission 54 may be a gearbox, a planetary gear system, or other transmission. Clutches 56 may be provided between the engine 50, the electric machine 52, and the transmission 54. The powertrain may be configured in various manners including as a parallel, a series, or a series-parallel hybrid vehicle.

The electric machine 52 receives electrical power to provide torque to the wheels 14 from a traction battery 58. The electric machine 52 may also be operated as a generator to provide electrical power to charge the battery 58, for example, during a braking operation.

The engine 50 may be an internal combustion engine such as a compression ignition engine or spark ignition engine. The engine 50 has an exhaust system 60 through which exhaust gases are vented from cylinders in the engine 50 to atmosphere. The exhaust system 60 may include a muffler for noise control. The emissions system 60 may also include an emissions system, such as a catalytic converter, particulate filter, and the like.

The engine 50 also has a coolant system 62. The coolant system contains an engine coolant fluid, which may include water, glycol, and/or another fluid, to remove heat from the engine 50 during operation. The engine 50 may be provided with an internal or external cooling jacket with passages to remove heat from various regions of the engine 50 using the recirculating engine coolant fluid. The coolant system 62 may include a pump and a reservoir (not shown).

The vehicle has a thermodynamic cycle 70. In one example, the cycle 70 is a Rankine cycle. In another example, the cycle 70 is a modified Rankine cycle, as discussed further below. The Rankine cycle 70 contains a working fluid. In one example, the working fluid undergoes phase change and is a mixed phase fluid within the system. The working fluid may be R-134a, R-245, or another organic or inorganic chemical refrigerant based on the desired operating parameters of the cycle.

The cycle 70 has a pump 72, compressor, or other device configured to increase the pressure of the working fluid. The pump 72 may be a centrifugal pump, a positive displacement pump, etc. The working fluid flows from the pump 72 to one or more heat exchangers. The heat exchangers may be preheaters, evaporators, superheaters, and the like configured to transfer heat to the working fluid. The example shown has a first heat exchanger 74, which is configured as a preheater. A second heat exchanger 76 is provided, and may be configured as an evaporator. In other examples, greater or fewer heat exchangers may be provided downstream of the pump 72. Additionally, the heat exchangers downstream of the pump 72 may be arranged or positioned in various manners relative to one another, for example, in parallel, in series as shown, or in a combination of series and parallel flows.

The heat exchangers 74, 76 are configured to transfer heat from an outside heat source to heat the working fluid within the cycle 70. In the example shown, the heat exchanger 74 is configured to transfer heat from the engine coolant fluid in coolant loop 62 to the working fluid in the cycle 70. The temperature of the engine coolant is therefore reduced before returning to the engine 50 to remove heat therefrom and heat exchanger 74 acts as a heat sink in the coolant system 62. The temperature of the working fluid of the cycle 70 is likewise increased within the heat exchanger 74. The heat exchanger 74 may be the sole heat sink provided in the engine coolant system 62, ignoring any thermal losses in the system 62. The engine coolant system 62 may therefore be provided in the vehicle without a radiator. A conventional radiator cools the engine coolant fluid via heat transfer to the ambient air.

In other examples, as discussed in greater detail below, the heat exchanger 74 is configured to transfer heat to the working fluid of the cycle 70 from another fluid in a vehicle system, including, but not limited to, an engine lubrication fluid, a transmission lubrication fluid, and a battery cooling fluid. The heat exchanger 74 replaces an ambient air-cooled heat exchanger for fluids in each of these systems, thereby recovering waste heat for use in the Rankine cycle 70, and eliminating the air cooled heat exchanger for the system in the vehicle. In another example, the heat exchanger 74 is positioned downstream of the heat exchanger 76 such that it is configured as a superheater, and transfers heat from a fluid from various vehicle systems, including, but not limited to, exhaust gas recirculation (EGR) flow. The heat exchanger 74 provides a heat sink for the EGR flow, and thereby eliminates an ambient air-cooled EGR heat exchanger for the system and recovers waste heat to the working fluid in the cycle 70 instead. The positioning of the heat exchanger 74 relative to heat exchanger 76 may be based on an average temperature or available heat in the fluids of the vehicle systems.

A second heat exchanger 76 is also provided in the cycle 70. The heat exchanger 76 is configured to transfer heat to the working fluid of the cycle from exhaust gases in the engine exhaust system 60 in one example. The engine exhaust system 60 may have a first flow path 78 through or in contact with the heat exchanger 76. The engine exhaust system 60 may also have a second, or bypass, flow path 80 to divert exhaust gas flow around the heat exchanger 76. A valve 82 may be provided to control the amount of exhaust gas flowing through the heat exchanger 76, which in turn provides a control over the amount of heat transferred to the working fluid, and the temperature and state of the working fluid at the exit of the heat exchanger 76 or upstream of the expander 84.

The expander 84 may be a turbine, such as a centrifugal or axial flow turbine, or another similar device. The expander 84 is rotated by the working fluid to produce work as the working fluid expands. The expander 84 may be connected to a motor/generator 86 to rotate the motor/generator to generate electrical power or to a mechanical linkage to provide mechanical power to the driveshaft of the vehicle. The expander 84 may be connected to the generator 86 by a shaft or another mechanical linkage. The generator 86 is connected to the battery 58 to provide electrical power to charge the battery 58. An inverter or AC-DC converter 88 may be provided between the generator 86 and the battery 58.

The working fluid leaves the expander 84 and flows to a heat exchanger 30, also referred to as a condenser 30 in the cycle 70. The condenser 30 may be positioned in a front region of the vehicle 10 as described above with respect to FIG. 1. The condenser 30 is configured to be in contact with an ambient air flow such that heat is transferred from the working fluid to the ambient air flow to remove heat from the working fluid and cool and/or condense the working fluid. The condenser 30 may be a single stage or multiple stages, and the flow of the working fluid may be controllable through the various stages as required by the cycle 70 using valves or other mechanisms.

In some examples, the cycle 70 includes a fluid accumulator 90 or dryer. The accumulator 90 may be provided as a fluid or liquid reservoir for the working fluid in the cycle 70. The pump 72 draws fluid from the accumulator 90 to complete the cycle 70. As can be seen from FIG. 2, the cycle 70 is a closed loop cycle such that the working fluid does not mix with other fluids in the vehicle or with ambient air.

The vehicle may also be provided with an air conditioning system 100 in one or more embodiments. The air conditioning system 100 may form a part of a heating, ventilation, and air conditioning (HVAC) system for the vehicle. The HVAC system provides air at a controlled temperature to the vehicle or passenger cabin for cabin climate control by the vehicle occupants. The air conditioning system 100 has a first heat exchanger 28 or condenser in contact with the ambient air. The condenser 28 may be positioned in the front region of the vehicle 10 as described above with respect to FIG. 1. The condenser 28 is configured for heat transfer between ambient air and a refrigerant or other fluid in the system 100.

The air conditioning system 100 may also include an expansion device, valve, or throttle 102, and a compressor or pumping device 104. The system 100 has another heat exchanger 106 in contact with air flow 110 to be directed to the vehicle cabin 108, and the refrigerant in the system 100. Air flow 110, which is intended for cabin conditioning, flows over and is cooled by refrigerant in the heat exchanger 106, and then flows to the cabin 108 as required by the vehicle occupants.

Figure 3:
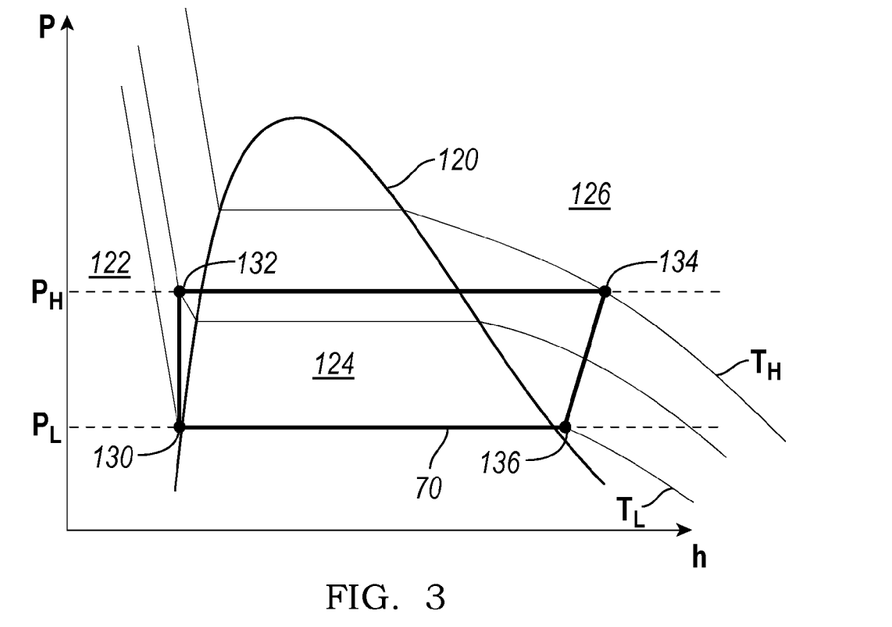
FIG. 3 illustrates a simplified pressure-enthalpy diagram for the Rankine cycle of FIG. 2.

The Rankine or thermodynamic cycle 70 as shown in FIG. 2 is illustrated on a pressure-enthalpy chart for the working fluid in FIG. 3. The chart has pressure (P) on the vertical axis and enthalpy (h) on the horizontal axis. Enthalpy may have units of energy per unit mass, e.g. kJ/kg.

The dome 120 provides a separation line between the various phases of the working fluid. The working fluid is a liquid or sub-cooled liquid in region 122 to the left of the dome 120. The working fluid is a vapor or superheated vapor in region 126 to the right of the dome 120. The working fluid is a mixed phase, e.g. a mixture of liquid and vapor phase, in region 124 underneath the dome 120. Along the left hand side of the dome 120, where region 122 and 124 meet, the working fluid is a saturated liquid. Along the right hand side of the dome 120, where region 124 and 126 meet, the working fluid is a saturated vapor.

The Rankine cycle 70 of FIG. 2 is illustrated on the chart according to an embodiment. The charted cycle 70 is simplified for the purposes of this disclosure, and any losses in the cycle 70 or system are not illustrated although they may be present in actual applications. Losses may include pumping losses, pipe losses, pressure and friction losses, heat loss through various components, and other irreversibilities in the system. The operation of the cycle 70 as shown in FIG. 3 in simplified to assume constant pressure, and adiabatic, reversible, and/or isentropic process steps as appropriate and as described below; however, one of ordinary skill in the art would recognize that the cycle 70 may vary from these assumptions in a real-world application. The cycle is charted as operating between a high pressure, $P_H$, and a low pressure, $P_L$. Constant temperature lines are shown on the chart as well, e.g. $T_H$ and $T_L$.

The cycle 70 begins at point 130 where the working fluid enters the pump 72. The working fluid is a liquid at 130, and may be sub-cooled to a temperature of 2-3 degrees Celsius or more below the saturation temperature at $P_L$. The working fluid leaves the pump 72 at point 132 at a higher pressure, $P_H$, and in a liquid phase. In the example shown, the pumping process from 130 to 132 is modeled as being isentropic, or adiabatic and reversible.

The working fluid enters one or more heat exchangers at 132, for example, heat exchangers 74, 76. The working fluid is heated within the heat exchangers 74, 76 using waste heat from a fluid in a vehicle system. In the example shown, the working fluid is heated using engine coolant and exhaust gas. The working fluid leaves the heat exchangers at point 134. The heating process from 132 to 134 is modeled as a constant pressure process. As can be seen from the Figure, the process from 132 to 134 occurs at $P_H$, and the temperature increases to $T_H$ at 134. The working fluid begins in a liquid phase at 132 and leaves the heat exchangers 74, 76 in a superheated vapor phase at 134.

The working fluid enters an expander 84, such as a turbine, at point 134 as a superheated vapor. The working fluid drives or rotates the expander as it expands to produce work. The working fluid exits the expander 84 at point 136 at a pressure, $P_L$. The working fluid may be a superheated vapor at 136, as shown. In other examples, the working fluid may be a saturated vapor or may be mixed phase and in region 124 after exiting the expander 84. In a further example, the working fluid is within a few degrees Celsius of the saturated vapor line on the right hand side of dome 120. In the example shown, the expansion process from 134 to 136 is modeled as isentropic, or adiabatic and reversible. The expander 84 causes a pressure drop and a corresponding temperature drop across the device as the working fluid expands.

The working fluid enters one or more heat exchangers at 136, for example, heat exchanger 30. The working fluid is cooled within the heat exchanger 30 using ambient air received through the frontal region of the vehicle. The working fluid leaves the heat exchanger at point 130, and then flows to the pump 72. An accumulator may also be included in the cycle 70. The heating process from 136 to 130 is modeled as a constant pressure process. As can be seen from the Figure, the process from 136 to 130 occurs at $P_L$. The temperature of the working fluid may decrease within the heat exchanger 30. The working fluid begins as a superheated vapor or vapor-liquid mixed phase at 136 and leaves the heat exchanger 30 as a liquid at 130.

In one example, the cycle 70 is configured to operate with a pressure ratio of $P_H$ to $P_L$ of approximately 3, or in a further example, with a pressure ratio of approximately 2.7. In other examples, the pressure ratio may be higher or lower. The cycle 70 may be adapted to operate in various ambient environments as required by the vehicle and its surrounding environment. In one example, the cycle 70 is configured to operate across a range of possible ambient temperatures. The ambient temperature may provide a limit to the amount of cooling available for the working fluid in the heat exchanger 30. In one example, the cycle 70 may be operated between an ambient or environmental temperature of −25 degrees Celsius and 40 degrees Celsius. In other examples, the cycle 70 may operate at higher and/or lower ambient temperatures.

The power provided by the cycle 70 may be a function of the mass flow rate of the waste heat fluid, the temperature of the waste heat fluid, the temperature of the working fluid at point 134, and the mass flow rate of ambient air. For example, with exhaust gas providing the sole source of waste heat, the power provided by the cycle 70 is a function of the mass flow rate of exhaust gas through the heat exchanger 78, the temperature of the exhaust gas entering heat exchanger 78, the temperature of the working fluid at point 134, and the mass flow rate of ambient air. For systems with more than one waste heat source, the mass flow rates and temperatures of each source would also be included for the power provided by the cycle 70. In one example, the power out of the cycle 70 was on the order of 0.5-1.5 kW, and in a further example, was approximately 1 kW for a cycle with exhaust temperatures ranging from 500-800 degrees Celsius, and an exhaust gas mass flow rate ranging from 50-125 kg/hr.

The efficiency of the cycle 70 with respect to the vehicle may be determined based on the electric power produced by the generator 86, and a rate of heat transfer available from the waste heat sources, e.g. engine exhaust, engine coolant, etc. The rate of heat available is a function of the mass flow rate of the waste heat fluid through the associated cycle heat exchanger and the temperature difference of the waste heat fluid across the heat exchangers. In one example, the cycle efficiency was measured to be above 5% on average using exhaust gas heat only, and in a further example, the cycle efficiency was measured to be above 8% on average for a cycle using exhaust gas waste heat only.

Maintaining the state or phase of the working fluid at specific operation points within the cycle 70 may be critical for system operation and maintaining system efficiency. For example, the working fluid may need to be a liquid phase at point 130 in the cycle to prevent air lock within the pump 72. Additionally, it may be desirable to maintain the working fluid as a vapor between points 134 and 136 based on the expander 84 construction, as a mixed phase may reduce system efficiencies or provide wear on the device 84. Based on the ambient air temperature, and the speed of the vehicle, which controls the ambient air flow rate, the amount and/or rate of cooling that is available to the working fluid within the heat exchanger 30 may also be limited. Furthermore, the amount and/or rate of heat available to heat the working fluid may be limited at vehicle start up when the engine exhaust and/or engine coolant has not reached their operating temperatures.

Figure 4:
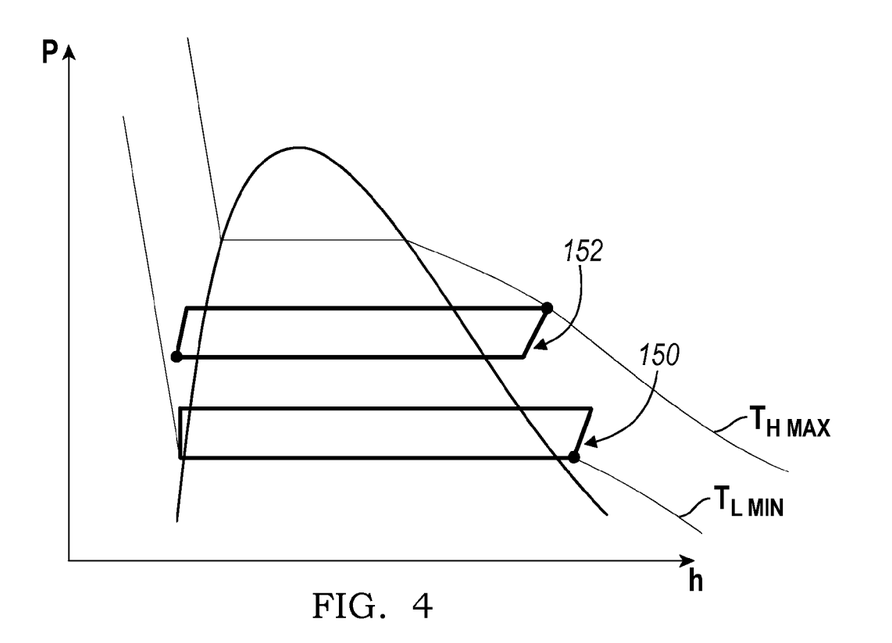
FIG. 4 illustrates a simplified pressure-enthalpy diagram for the Rankine cycle of FIG. 2 at various operating conditions.

The cycle 70 may be operated at various operating conditions, as shown in FIG. 4. FIG. 4 illustrates two operating conditions for the cycle 70. Cycle 150 is shown operating at or near a minimum ambient air operating temperature, $T_{L,min}$. Cycle 152 is shown operating at or near a maximum ambient air operating temperature, $T_{H,max}$. The working fluid is selected based the cycles and operating states of the various points in the cycle, and the constraints imposed by these operating states.

Additionally, the cycle 70 may be controlled to operate within a desired temperature and pressure range by modifying the flow rate of exhaust gas or other waste heat source through the heat exchangers 74, 76, thereby controlling the amount of heat transferred to the working fluid and its temperature at point 134. The heat exchanger 30 may also be controlled by providing additional stages, or limiting stages for working fluid to flow through based on the ambient air temperature, flow rate, and humidity, thereby controlling the amount of cooling and the working fluid temperature at point 130. Additionally, the flow rate of the working fluid may be controlled by the pump 72, such that the working fluid has a longer or shorter residence time in each heat exchanger 30, 74, 76, thereby controlling the amount of heat transferred to or from the working fluid.

Figure 5:
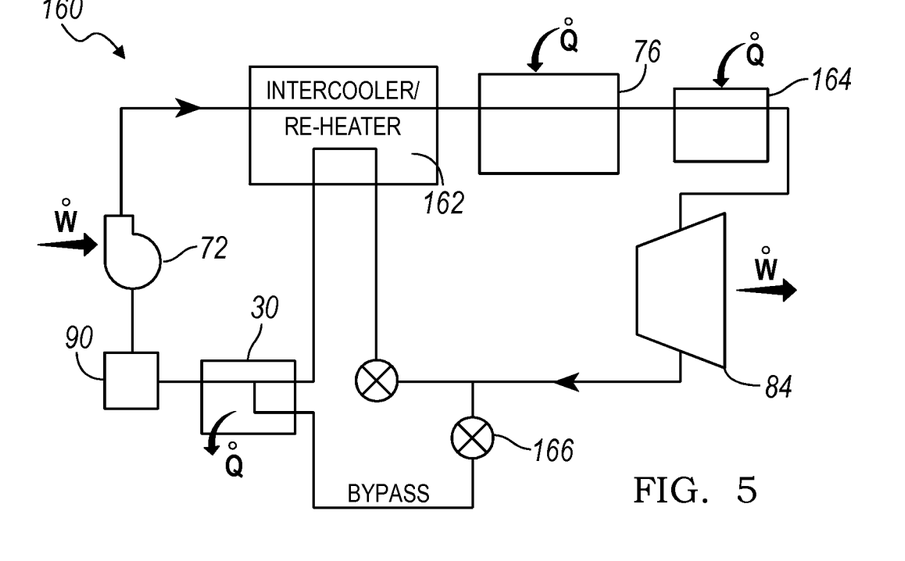
FIG. 5 illustrates a Rankine cycle for a vehicle according to another embodiment.

FIG. 5 illustrates a schematic of a thermodynamic cycle 160 according to another embodiment for a vehicle, such as vehicle 10. Similar elements in the cycle as those described above with respect to FIG. 2 are provided with the same reference number. The cycle 160 is additionally provided with an intercooler 162. The working fluid is preheated in the intercooler 162 before entering a heat exchanger 76 using residual heat in the working fluid after the working fluid exits the expander 84. This also has the benefit of precooling the working fluid using the intercooler 162 before it enters the heat exchanger 30. The intercooler 162 recovers heat within the cycle 160, thereby increasing the cycle efficiency.

The cycle 160 is also shown as having a superheater 164. The superheater 164 may be provided to recover waste heat energy from an EGR flow, thereby eliminating an EGR ambient air-cooler from the vehicle. The EGR flow is used to heat the working fluid after the exhaust gas flow in heat exchanger 76, as the EGR temperature is often higher than the exhaust flow temperature.

The cycle 160 also may have a bypass line around the heat exchanger 30 and/or intercooler 162, and the bypass may include one or more control valves 166. The bypass may be used when the ambient temperature is low, for example, in winter, and the cooling required by the working fluid in the heat exchanger 30 is reduced. Flow to the intercooler 162 may also be controlled using valve(s) 166. The intercooler 162 may be used when the ambient temperature is high, for example, in summer, to reduce the load on the heat exchanger 30.

Figure 6:
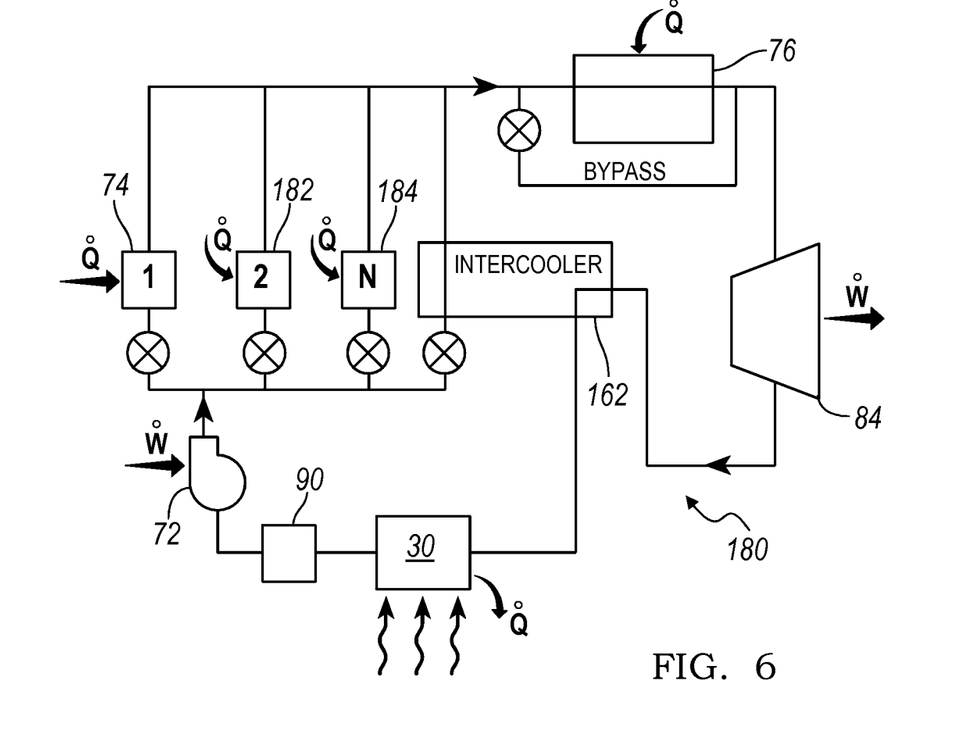
FIG. 6 illustrates a Rankine cycle for a vehicle according to yet another embodiment.

FIG. 6 illustrates a schematic of a thermodynamic cycle 180 according to yet another embodiment for a vehicle, such as vehicle 10. Similar elements in the cycle as those described above with respect to FIGS. 2 and 5 are provided with the same reference number. The cycle 180 is provided with multiple heat exchangers 74, 182, 184 acting as preheaters. The cycle 180 may have any number of preheaters, and may also include one or more superheaters, as described above. Each preheater may provide a sole or primary heat sink for a vehicle system requiring cooling, thereby eliminating air cooled heat exchangers for each of these vehicle systems. Any waste heat from a fluid in a given vehicle system may be transferred to the working fluid within the Rankine cycle. The working fluid in the Rankine cycle then operates the expander, recovering a portion of the waste heat as electrical power. The working fluid is then cooled by ambient air in the condenser 30 positioned in the front region of the vehicle.

In one example, the engine coolant system uses a heat exchanger 74 in the cycle 180, where any cooling of the coolant is provided via heat transfer with the working fluid, and no radiator is present in the vehicle. An engine lubrication system may use another heat exchanger 182 in the cycle 180, where any cooling of the engine lubricant or oil is provided through heat transfer with the working fluid, and no air-cooled engine oil cooler is present in the vehicle. A transmission lubrication system may use another heat exchanger 184 in the cycle 180, where any cooling of the transmission lubricant or oil is provided through heat transfer with the working fluid, and no air-cooled transmission oil cooler is present in the vehicle. In another example, a battery or electrical cooling system may use a heat exchanger 184 in the cycle 180, where any cooling of the battery coolant is provided through heat transfer with the working fluid, and no air-cooled battery coolant cooler is present in the vehicle.

Flow of the working fluid through each of the heat exchangers 74, 182, 184, 76, 162 may be controlled to control the state of the working fluid at various points within the Rankine cycle 180, as well as control the various coolant/lubricant temperatures or fluid temperature in the vehicle system to the desired operating temperature for the associated system operation.

Various embodiments of the present disclosure have associated, non-limiting advantages. For example, a Rankine cycle for a vehicle is provided to recover waste heat energy from vehicle systems and charge a battery. The condenser of the Rankine cycle is provided in a front region of the vehicle to use the incoming ambient air flow to cool the working fluid of the cycle. Air-cooled heat exchangers for fluids providing waste heat to the Rankine cycle are therefore eliminated, and provide additional packaging space for the condenser. The Rankine cycle includes heat exchangers to heat the working fluid that also act as heat sinks for the waste heat fluids, and may be positioned at various locations in the vehicle. By using one condenser in the Rankine cycle to transfer residual waste heat to ambient air from various multiple vehicle systems, the overall size of the condenser may be smaller than the cumulative size of corresponding air-cooled heat exchangers for the system as the various vehicle systems generally do not all operate at maximum cooling load simultaneously, and space that would have otherwise been required between individual air coolers may be also used for the Rankine condenser.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a power circuit having in sequential fluid communication: a pump, an evaporator, an expander, and a condenser configured to transfer heat between a working fluid and ambient air, wherein the evaporator is configured to transfer heat from an engine coolant, a battery coolant, an engine lubricant, a transmission lubricant, an exhaust gas and an exhaust gas recirculation (EGR) system to the working fluid, and wherein the condenser is positioned in a front region of a body of the vehicle, the front region configured to receive ambient air when the vehicle is in motion; and
a generator driven by the expander; and
an air-conditioning circuit for a vehicle cabin having another condenser and containing a refrigerant fluid, wherein the another condenser is positioned within the front region and configured to transfer heat between the refrigerant fluid and ambient air, the another condenser being adjacent to the condenser of the power circuit, the air-conditioning circuit being independent of the power circuit;
wherein the condenser of the power circuit has a first air-cooled portion and a second air-cooled portion, the first and second portions configured to transfer heat between the working fluid and ambient air;
wherein the another condenser is positioned between and adjacent to the first portion and the second portion of the condenser of the power circuit; and
wherein the another condenser of the air-conditioning circuit, the first portion and the second portion of the condenser of the power circuit are arranged along a longitudinal axis of the vehicle.

2. The vehicle of claim 1 further comprising an engine having an exhaust system;
wherein the evaporator is configured to transfer heat between the exhaust gas in the exhaust system and the working fluid.

3. The vehicle of claim 2 wherein the evaporator further comprises a heat exchanger for each of the engine coolant, the battery coolant, the engine lubricant, the transmission lubricant, the exhaust gas in the EGR system, and the exhaust gas in the exhaust system.

4. The vehicle of claim 2 wherein the exhaust system has a valve configured to control a flow of the exhaust gas between the evaporator and a bypass conduit.

5. The vehicle of claim 1 further comprising a traction battery in electrical communication with the generator; and
an electrical machine adapted to provide torque to a traction wheel and in electrical communication with the traction battery.

6. A vehicle process comprising:
pumping a working fluid in a closed loop thermodynamic cycle formed by a power circuit;
heating the working fluid using waste heat from a recirculating fluid in a vehicle system;
controlling a flow of engine exhaust gas through an evaporator in the cycle, a bypass line, and a combination of the evaporator and bypass line;
heating the working fluid with any engine exhaust gas flowing through the evaporator;
driving a turbine using the working fluid to rotate an electrical power generator; and
cooling the working fluid in a condenser of the cycle using ambient air received through an opening in a frontal region of a body of the vehicle, wherein the working fluid is cooled in a first portion of the condenser of the cycle using ambient air received through the opening and cooled in a second portion of the condenser of the cycle using ambient air received through the opening, the first portion of the condenser positioned between the opening and the second portion of the condenser, an air-conditioning condenser containing a refrigerant positioned between and adjacent to the first and second portions of the condenser, the air-conditioning condenser and the first and second portions being arranged along a longitudinal axis of the vehicle, the air-conditioning condenser provided in an air-conditioning circuit that is independent of the power circuit.

7. The process of claim 6 wherein the working fluid is heated to a predetermined vapor phase by the recirculating fluid and the exhaust gas; and
wherein controlling the flow of exhaust gas through the evaporator further comprises maintaining the predetermined vapor phase of the working fluid after heating in the cycle by (i) increasing the flow of exhaust gas through the evaporator as a temperature of the recirculating fluid decreases, and (ii) decreasing the flow of exhaust gas through the evaporator as the temperature of the working fluid increases.

8. A vehicle comprising:
a working fluid power circuit having: a pump, an evaporator receiving heat from engine exhaust gas and a recirculating fluid, an expander, and a condenser having first and second air-cooled portions arranged sequentially; and
an independent refrigerant air-conditioning circuit having an air-cooled air-conditioning condenser positioned between and adjacent to the first and second portions, the air-conditioning condenser and the first and second portions arranged along a longitudinal vehicle axis.

9. The vehicle of claim 8 further comprising:
an internal combustion engine having an exhaust system containing engine exhaust gas;
a generator driven by the expander;
a traction battery in electrical communication with the generator; and
an electrical machine to provide torque to a traction wheel and in electrical communication with the traction battery.

10. The vehicle of claim 9 wherein the electrical machine is coupled to the engine by an upstream clutch and is coupled to the traction wheel via a transmission.

11. The vehicle of claim 8 wherein the evaporator comprises a first heater and a second heater arranged sequentially in the power circuit.

12. The vehicle of claim 11 further comprising an exhaust bypass associated with one of the first and second heaters, and a valve adapted to control engine exhaust gas through the one of the first and second heaters.

13. The vehicle of claim 8 wherein the power circuit further comprises a preheater to exchange heat between working fluid in the power circuit downstream of the expander and working fluid in the power circuit downstream of the pump.

14. The vehicle of claim 8 further comprising a recirculating system containing the recirculating fluid to remove waste heat from a vehicle component, the vehicle component being one of an engine, a transmission, and a battery, and the recirculating fluid is one of an engine coolant, an engine lubrication fluid, a transmission lubrication fluid, and a battery coolant; and
an engine exhaust system having a valve configured to controllably provide waste heat from engine exhaust gas to the evaporator to evaporate the working fluid in the power circuit.

15. The vehicle of claim 8 further comprising an exhaust gas recirculation (EGR) system wherein the recirculating fluid is EGR gas; and
an engine exhaust system having a valve configured to controllably provide waste heat from engine exhaust gas to the evaporator to evaporate working fluid in the power circuit.

* * * * *